No. 733,533. PATENTED JULY 14, 1903.
S. R. BAILEY.
AXLE NUT.
APPLICATION FILED JAN. 12, 1903.
NO MODEL.
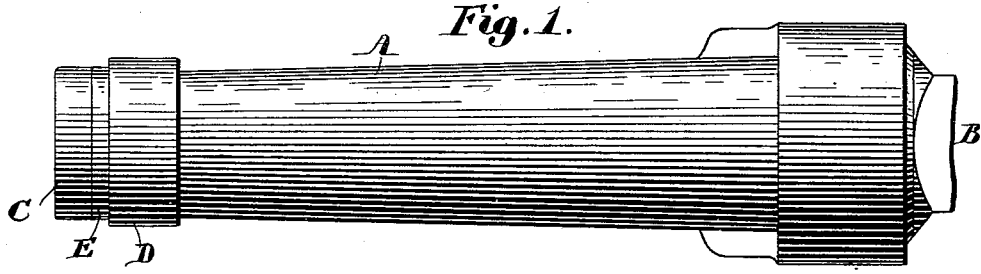
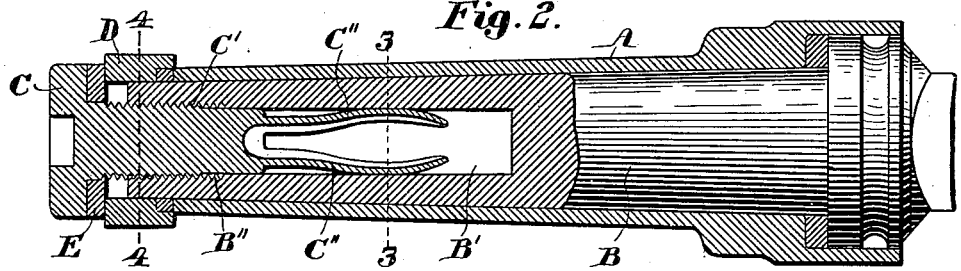
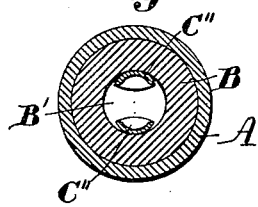 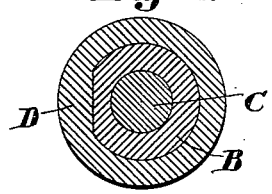 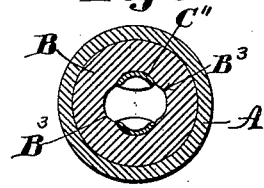
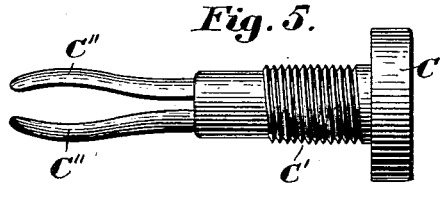 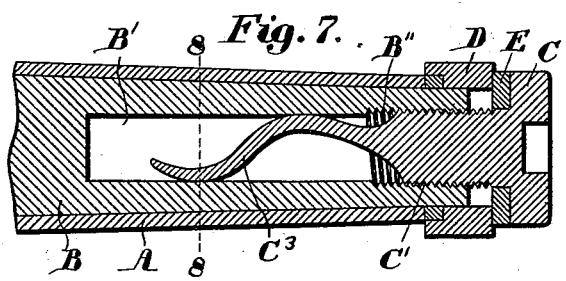
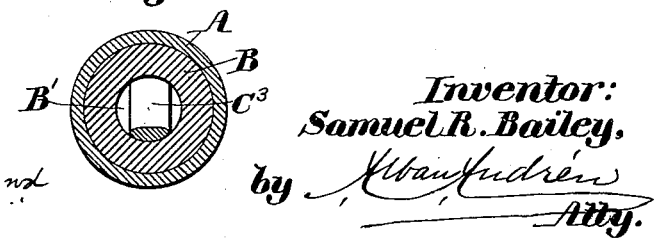
Witnesses:
Edwin T. Luce
Nathan C. Lombard 2nd
Inventor:
Samuel R. Bailey,
by Alban Andrew
Atty.
THE NORRIS PETERS CO., PHOTO-LITHO., WASHINGTON, D. C.

No. 733,533. Patented July 14, 1903.

UNITED STATES PATENT OFFICE.

SAMUEL R. BAILEY, OF AMESBURY, MASSACHUSETTS.

AXLE-NUT.

SPECIFICATION forming part of Letters Patent No. 733,533, dated July 14, 1903.

Application filed January 12, 1903. Serial No. 138,637. (No model.)

*To all whom it may concern:*

Be it known that I, SAMUEL R. BAILEY, a citizen of the United States, and a resident of Amesbury, in the county of Essex and State of Massachusetts, have invented certain new and useful Improvements in Axle-Nuts, of which the following is a specification.

This invention relates to improvements in adjustable axle-nuts, especially designed for carriage-axles, for the purpose of setting up from time to time and adjusting the position of the axle-nut relative to the end of the axle-box and holding said nut securely in its adjusted position without the employment of check-nuts, as will hereinafter be more fully shown and described, reference being had to the accompanying drawings, wherein—

Figure 1 is a side elevation of the invention. Fig. 2 is a central longitudinal section of Fig. 1. Fig. 3 is a cross-section on the line 3 3 shown in Fig. 2. Fig. 4 is a cross-section on the line 4 4 shown in Fig. 2. Fig. 5 is a detail side elevation of the adjustable axle-nut, showing it detached from the axle. Fig. 6 is a cross-section of the axle, showing a modification thereof. Fig. 7 is a longitudinal section of the axle, showing a modification of the axle-nut; and Fig. 8 is a cross-section on the line 8 8 shown in Fig. 7.

Similar letters refer to similar parts wherever they occur on the different parts of the drawings.

A represents the axle-box, and B represents the axle journaled therein as usual.

Within the outer end of the axle is made a central cylindrical recess $B'$ of even and uniform size throughout its length. The outer end of said recess is provided with an internal screw-thread $B''$, as shown in Fig. 2.

C represents the head of the axle-nut, which may be adjusted by means of a suitable wrench, key, or spanner in any suitable, desirable, or well-known manner. The head C is provided with a screw-threaded shank $C'$, which is adjustable in the female screw-threaded recess $B''$, as shown. Secured to or made integral with the shank $C'$ are made yielding prongs $C'' C''$, adapted to bear frictionally against the cylindrical bore $B'$ during the adjustment of the axle-nut.

By making the recess $B'$ in the axle B cylindrical in section and of even and uniform size throughout its length the yielding prongs $C'' C''$ are held frictionally in contact with the interior of said recess $B'$ with a constant or uniform pressure during the adjustment of the axle-nut.

If it is desired to positively lock the axle-nut to the axle, I may make on the interior of the cylindrical recess $B'$ one or more longitudinal notches $B^3 B^3$, as shown in Fig. 6, into which the expansive prongs $C'' C''$ may be interlocked during the adjustment of the axle-nut, so as to more securely hold the axle-nut in its adjusted position relative to the axle for preventing the axle-nut from working loose by the jarring of the vehicle.

I wish to state that I do not desire to limit myself to making the bore in the axle cylindrical in section, as it may be longitudinally grooved, as above described, and represented in Fig. 6, for the purpose stated. I also wish to state that although in practice I prefer to provide the shank of the axle-nut with a pair or plurality of expansive prongs $C'' C''$, as shown in Figs. 2, 3, and 5, I may, if so desired, make use of a single spring-metal prong $C^3$, as shown in Figs. 7 and 8.

On the outer end of the axle B is loosely fitted what is usually termed a "D-washer" D, which corresponds in cross-section to that of the end of the axle, so as to permit said washer to be longitudinally adjusted upon the axle end relative to the end of the axle-box without rotating with said axle-box.

In devices of this kind it is desirable that the end thrust of the wheel and axle-box relative to the axle-nut should be taken up, so as to prevent rattling caused by the wear of the adjacent parts or otherwise, and for such purpose I interpose between the inner end of the nut-head C and outer end of the D-washer an elastic cushion or spring E, as shown in Figs. 2 and 7, which may be made of leather, rubber, or other suitable elastic or yielding material, or, if so desired, it may be made in the form of a coiled or elastic metal spring, as may be most practical and desirable.

Having thus fully described the nature, construction, and operation of my invention, I wish to secure by Letters Patent and claim—

1. The herein-described adjustable axle-nut device, consisting in combination, an axle-box, an axle having a longitudinal recess, screw-threaded at its outer end, a screw-threaded nut, provided with a friction device adjustable within the axle-recess, a non-rotating and longitudinally-adjustable washer arranged upon the axle end and an elastic cushion arranged upon the axle-nut between its head and the outer end of said washer, substantially as and for the purpose set forth.

2. The herein-described adjustable axle-nut device, consisting in combination, with an axle, having a longitudinal recess screw-threaded at its outer end, an adjustable screw-threaded nut provided with a friction device adjustable within the axle-recess, a non-rotating and longitudinally-adjustable washer arranged upon the axle end and an elastic cushion interposed between said washer and head of the axle-nut, substantially as and for the purpose set forth.

3. The herein-described adjustable axle-nut device, consisting in combination, with an axle having a longitudinal recess of uniform size throughout its length, and screw-threaded at its outer end, a screw-threaded axle-nut, provided with a friction device, adjustable within the axle-recess, and an elastic cushion intermediate the head of the axle-nut and a washer interposed between said cushion and axle-box, substantially as and for the purpose set forth.

In testimony whereof I have affixed my signature in presence of two witnesses.

SAMUEL R. BAILEY.

Witnesses:
ALBAN ANDRÉN,
NATHAN C. LOMBARD, 2d.